(12) United States Patent
Lee (10) Patent No.: US 7,730,295 B1
(45) Date of Patent: Jun. 1, 2010

(54) UPDATING FIRMWARE OF A PERIPHERAL DEVICE

(75) Inventor: Brian K. Lee, Yorba Linda, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 809 days.

(21) Appl. No.: 11/515,554

(22) Filed: Sep. 5, 2006

(51) Int. Cl.
G06F 1/24 (2006.01)
G06F 9/00 (2006.01)

(52) U.S. Cl. .............................. 713/100; 713/1; 713/2

(58) Field of Classification Search ...................... 713/1, 713/2, 100
See application file for complete search history.

(56) References Cited

U.S. PATENT DOCUMENTS

| | | | |
|---|---|---|---|
| 6,021,276 A | 2/2000 | Demke et al. | |
| 6,272,629 B1 | 8/2001 | Stewart et al. | |
| 6,584,559 B1 | 6/2003 | Huh et al. | |
| 6,718,373 B1 | 4/2004 | Bearden et al. | |
| 6,832,312 B1 | 12/2004 | Rochford, II | |
| 6,892,297 B1 | 5/2005 | Aguilar et al. | |
| 6,948,165 B1 | 9/2005 | Luu et al. | |
| 6,954,852 B2 | 10/2005 | Burokas et al. | |
| 6,961,765 B2 | 11/2005 | Terry | |
| 7,010,624 B1 * | 3/2006 | Zhou et al. | 710/8 |
| 7,073,017 B2 * | 7/2006 | Yamamoto | 711/103 |
| 7,181,458 B1 * | 2/2007 | Higashi | 707/100 |
| 7,426,633 B2 * | 9/2008 | Thompson et al. | 713/2 |
| 7,457,945 B2 * | 11/2008 | Dailey et al. | 713/2 |
| 7,558,867 B2 * | 7/2009 | Le et al. | 709/230 |
| 2003/0236970 A1 | 12/2003 | Palmer et al. | |
| 2004/0019752 A1 * | 1/2004 | Burton et al. | 711/154 |
| 2004/0030877 A1 * | 2/2004 | Frid | 713/1 |
| 2005/0216753 A1 * | 9/2005 | Dailey et al. | 713/191 |
| 2005/0235280 A1 * | 10/2005 | Le et al. | 717/173 |
| 2006/0168368 A1 * | 7/2006 | Chen et al. | 710/22 |
| 2006/0206674 A1 * | 9/2006 | Chang | 711/154 |
| 2006/0259756 A1 * | 11/2006 | Thompson et al. | 713/2 |
| 2008/0028385 A1 * | 1/2008 | Brown et al. | 717/170 |

OTHER PUBLICATIONS

"What Determines When a Driver Is Loaded", Windows Driver Kit: Installable File System Drivers, http://msdn.microsoft.com/library/default.asp?url=/library/en-us/IFSK_d/hh/IFSK_d/Ch1FileSystemFundamentals.

* cited by examiner

Primary Examiner—Thomas Lee
Assistant Examiner—Jaweed A Abbaszadeh

(57) ABSTRACT

An embodiment of the present invention comprises a method of updating firmware of a peripheral device coupled to a computer system. A first boot operation is executed for loading an operating system into the computer system, and an update routine is installed for loading updated firmware into the peripheral device. The operating system is modified so that the update routine is executed early during a second boot operation for loading the operating system into the computer system. The second boot operation is executed, during which the update routine is executed to load the updated firmware into the peripheral device. In one embodiment, the update routine comprises an update driver having a DriverEntry code segment for loading the updated firmware into the peripheral device.

24 Claims, 11 Drawing Sheets

```
DriverEntry
{
        DoDriveUpdate();

return STATUS_UNSUCCESSFUL;
}
```

UPDATING FIRMWARE OF A PERIPHERAL DEVICE

BACKGROUND OF THE INVENTION

1. Field of the Invention

The present invention relates to peripheral devices of computer systems. More particularly, the present invention relates to updating firmware of a peripheral device.

2. Description of the Prior Art

Peripheral devices coupled to computer systems (e.g., disk drives including magnetic and optical disk drives, printers, network interface cards, graphics cards, routers, etc.) typically comprise firmware executed by a microprocessor in order to implement the various functions of the peripheral device. For a number of reasons, it may be desirable to update the firmware within the peripheral device while in the field, for example, to fix programming bugs or to install new feature sets. An update application is typically executed by the computer system in order to load updated firmware into the peripheral device.

Running an update application may not be practical for certain peripheral devices. For example, certain versions of the Microsoft Windows® operating system periodically access the computer system's disk drive in order to access a system file. If an update application attempted to load updated firmware into the disk drive during operation of such an operating system, it would prevent the disk drive from servicing the periodic access requests by the operating system, and may ultimately "hang" it. Another drawback of an update application is that the operating system may configure the peripheral device into a particular operating mode, which may be "lost" once the peripheral device is reset to execute the updated firmware. Typically the computer system must then be rebooted after installing the updated firmware so that the operating system can reconfigure the peripheral device.

There is, therefore, a need to update the firmware of a peripheral device without hanging the operating system of the computer system. In another embodiment, there is a need to update the firmware of a peripheral device without needing to reboot the computer system after loading the updated firmware into the peripheral device.

SUMMARY OF THE INVENTION

An embodiment of the present invention comprises a method of updating firmware of a peripheral device coupled to a computer system. A first boot operation is executed for loading an operating system into the computer system, and an update routine is installed for loading updated firmware into the peripheral device. The operating system is modified so that the update routine is executed early during a second boot operation for loading the operating system into the computer system. The second boot operation is executed, during which the update routine is executed to load the updated firmware into the peripheral device.

In one embodiment, the operating system periodically accesses the peripheral device, and wherein modifying the operating system comprises modifying the operating system so that the update routine is executed prior to the operating system periodically accessing the peripheral device. In one embodiment the peripheral device comprises a disk drive, and the operating system periodically accesses the disk drive to access a system file, such as the Windows "pagefile.sys" system file.

In another embodiment, the operating system configures the peripheral device, and wherein modifying the operating system further comprises modifying the operating system so that the update routine is executed prior to the operating system configuring the peripheral device.

In yet another embodiment, executing the first boot operation comprises executing an operating system loader program for loading the operating system into the computer system, the update routine comprises an update driver, and modifying the operating system comprises installing the update driver so that the operating system loader program executes the update driver during the second boot operation. In one embodiment, the operating system comprises a registry file and modifying the operating system comprises inserting a SERVICE_BOOT_START entry into the registry file for the update driver.

In still another embodiment, the update routine comprises an update driver including a DriverEntry procedure, and executing the second boot operation includes executing the DriverEntry procedure to load the updated firmware into the peripheral device.

Another embodiment of the present invention comprises a method of updating firmware of a peripheral device coupled to a computer system. A first boot operation is executed for loading an operating system into the computer system, and an update driver is installed for loading updated firmware into the peripheral device. The update driver is executed during a second boot operation of the computer system, after which the update driver is uninstalled.

In one embodiment, uninstalling the update driver occurs during the second boot operation.

In another embodiment, uninstalling the update driver comprises modifying the operating system so that the update driver is not executed during a boot operation subsequent the second boot operation.

In still another embodiment, the operating system comprises a registry file and installing the update driver comprises inserting a corresponding entry in the registry file. In one embodiment, uninstalling the update driver comprises deleting the corresponding entry in the registry file.

In another embodiment, the update driver returns an error code (e.g., ERROR_UNSUCCESFUL) to unload the update driver during the second boot operation.

In still another embodiment, an installation application is installed to install the update driver after the first boot operation, and the operating system is modified so that the installation application is re-executed during a subsequent boot operation. In one embodiment, the subsequent boot operation is the second boot operation. In another embodiment, the operating system comprises a registry file, and a RunOnce entry is inserted into the registry file so that the installation application is re-executed during a subsequent boot operation.

In yet another embodiment, an installation application is executed to install the update driver after the first boot operation, and the installation application uninstalls the update driver by modifying the operating system so that the update driver is not executed during a subsequent boot operation.

Another embodiment of the present invention comprises a method of updating firmware of a peripheral device coupled to a computer system. A first portion of an operating system is loaded into the computer system during a boot operation, and after loading the first operating system portion, loading updated firmware into the peripheral device before completing the boot operation. In one embodiment, a basic input/output system (BIOS) executes an operating system loader program to load the operating system into the computer system. In yet another embodiment, after loading the updated firmware into the peripheral device, a remaining portion of the operating system is loaded into the computer system without rebooting the computer system.

Another embodiment of the present invention comprises a computer readable storage medium storing code segments of an installation application, the code segments configured to be executed by a computer system comprising an operating system. The installation program comprising code segments for installing an update routine for loading updated firmware into a peripheral device coupled to the computer system, and modifying the operating system so that the update routine is executed early during a boot operation for loading the operating system into the computer system.

Another embodiment of the present invention comprises a computer readable storage medium storing code segments of an update driver, the code segments configured to be executed by a computer comprising an operating system. The update driver comprises a DriverEntry code segment executed by the computer system during a boot operation, wherein the DriverEntry code segment loads updated firmware into a peripheral device coupled to the computer system.

DESCRIPTION OF THE PREFERRED EMBODIMENTS

Figure 1A:
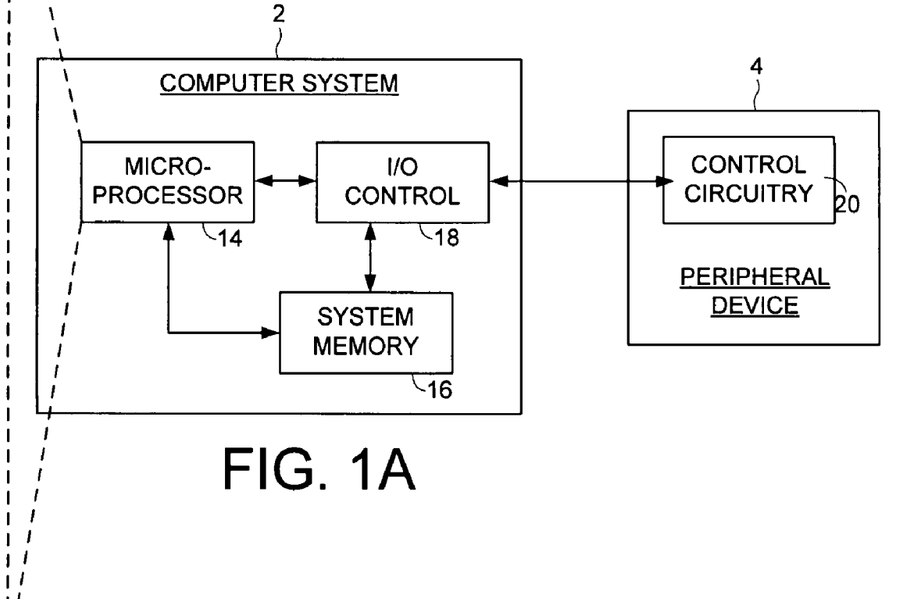
FIG. 1A shows a computer system according to an embodiment of the present invention including a peripheral device coupled to the computer system.
Figure 1B:
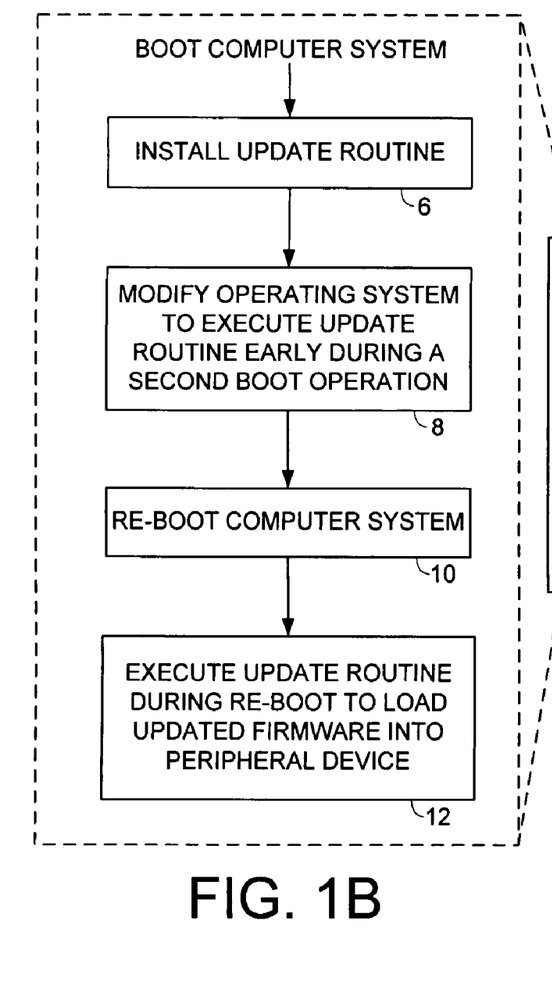
FIG. 1B is a flow diagram executed by the computer system to load updated firmware into the peripheral device early during a boot operation of the computer system.

FIG. 1A shows a computer system 2 with a peripheral device 4 coupled to the computer system 2, and FIG. 1B is a flow diagram executed by the computer system 2 to load updated firmware into the peripheral device 4. A first boot operation is executed for loading an operating system into the computer system 2, and at step 6 an update routine is installed for loading updated firmware into the peripheral device 4. At step 8 the operating system is modified so that the update routine is executed early during a second boot operation for loading the operating system into the computer system 2. At step 10 the second boot operation is executed, during which the update routine is executed at step 12 to load the updated firmware into the peripheral device 4.

In the embodiment of FIG. 1A, the computer system comprises a microprocessor 14 for executing code segments of various programs, such as the operating system and user applications, and code segments for communicating with the peripheral device 4. The computer system further comprises input/output (I/O) control circuitry 18 for interfacing with the peripheral device 4, such as control circuitry for implementing the Universal System Bus (USB) interface, Serial Advanced Technology Attachment (SATA) interface, or any other suitable interface. In one embodiment, the computer system comprises a personal computer (PC), such as a desktop or laptop computer system, and in another embodiment, the computer system comprises a server computer.

In one embodiment, the operating system implements a graphical user interface to facilitate interfacing the computer system directly with an end user. In another embodiment, the operating system implements a remote user interface for interfacing with an end user over a network. The operating system may perform support functions for user applications, and in one embodiment the operating system comprises a kernel for implementing high level support functions as well as device drivers for implementing low level interface functions for interfacing with peripheral devices, such as a monitor, key board, disk drive, printer, network interface, etc. The operating system may also implement a file system to organize files into directories, locate files, create files, remove files, share files over a network, launch application files, etc. In some embodiments, the operating system implements functionality to support multi-user operations, including user access rights as well as arbitration to resources such as peripheral devices. The operating system may also implement functionality to support security, including end user access rights and network security (e.g., firewall support).

Any suitable operating system may be employed in the embodiments of the present invention, such as an operating system from Microsoft Corporation (Microsoft Windows® XP, Microsoft Windows® Server 2003, Microsoft Windows® Vista™, etc.), an operating system from Apple Computer, Inc. (Mac OS® 8.x, 9.x, 10.x, etc.), or a UNIX based operating system, such as Sun™ Solaris™, Red Hat® Linux®, etc. In addition, any suitable type of operating system may be employed, such as a multi-user operating system, multiprocessor operating system, multitasking operating system, multithreading operating system, real time operating system, etc.

The peripheral device 4 comprises suitable control circuitry 20 for interfacing with the computer system 2, which may include a microprocessor for executing code segments of suitable firmware. In one embodiment, the control circuitry 20 further comprises suitable non-volatile semiconductor memory (e.g., EEPROM, FLASH, etc.) for storing the firmware. In another embodiment, the firmware is stored in an alternative type of non-volatile memory, such as a magnetic disk, and then loaded into volatile semiconductor memory (e.g., DRAM, SRAM, etc.) for execution by the microprocessor. When the updated firmware is loaded (transferred) from the computer system 2 to the peripheral device 4, the updated firmware is stored in the non-volatile memory, and may overwrite the previous version of the firmware.

Figure 2A:
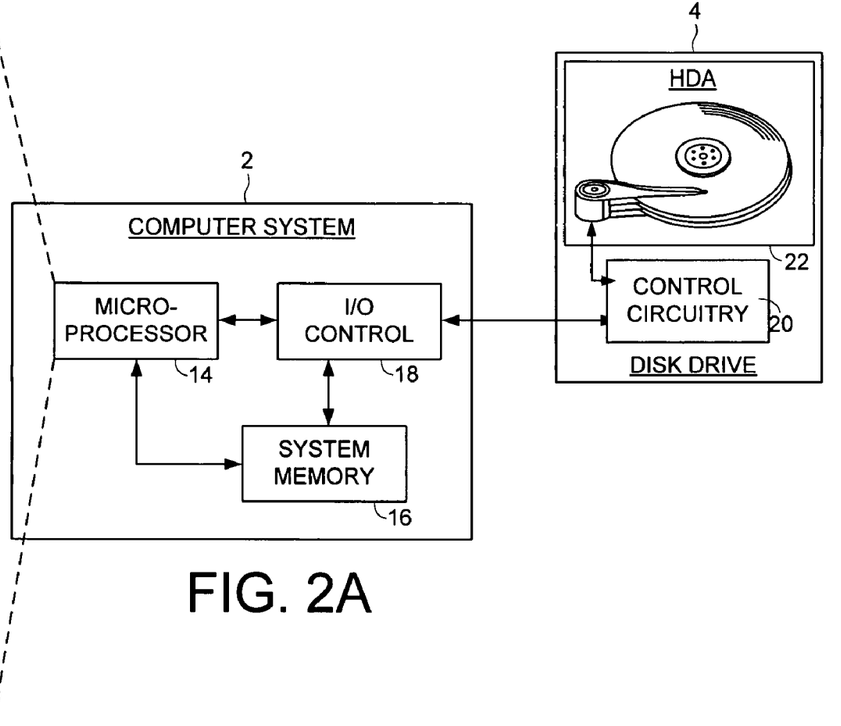
FIG. 2A shows an embodiment of the present invention wherein the peripheral device comprises a disk drive.
Figure 2B:
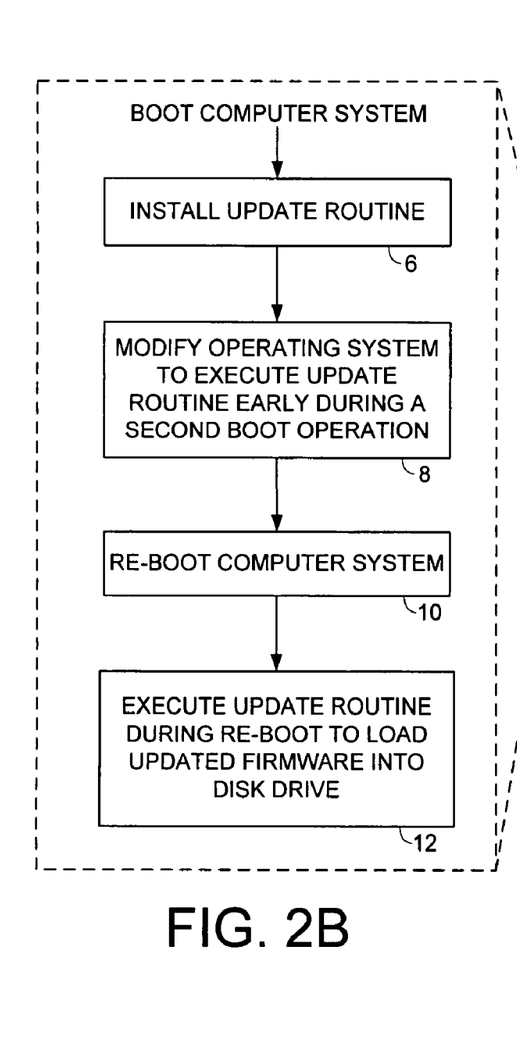
FIG. 2B is a flow diagram according to an embodiment of the present invention for loading updated firmware into the disk drive early during the boot operation.

FIG. 2A shows an embodiment of the present invention wherein the peripheral device 4 comprises a disk drive including a head disk assembly (HDA) 22 housing one or more disks and heads actuated over the disks. In this embodiment, the operating system is stored on the disks of the disk drive 4 and read into (loaded into) the system memory 16 of the computer system 2. In one embodiment, the computer system 2 comprises a basic input/output system (BIOS) stored in a non-volatile semiconductor memory (e.g., EEPROM, FLASH, etc.) which is executed first when the computer system 2 is powered on or rebooted.

The BIOS may comprise code segments for initializing and testing various components of the computer system 2, such as the I/O control circuitry 18 for interfacing with the disk drive 4. The BIOS may comprise any suitable code segments, and in one embodiment may be provided by any suitable manufacturer, such as BIOS manufactured by Phoenix Technologies, Ltd or Open Firmware manufactured by Apple Computer, Inc. In one embodiment, the BIOS comprises vendor specific BIOS extensions which may be stored in a non-volatile semiconductor memory or on the disk of a disk drive. In another embodiment, the BIOS comprises next generation code segments, such as the Extended Firmware Interface developed by Intel Corporation.

In one embodiment, the boot operation comprises the BIOS executing an operating system loader program for loading the operating system into the system memory 16 of the computer system 2. In one embodiment, the operating system loader program is implemented in firmware as part of the BIOS. In another embodiment, the operating system loader program is loaded into the system memory 16 of the computer system 2 by the BIOS before being executed. For example, a boot sector of a disk drive may comprise the operating system loader program which is loaded by the BIOS into the system memory 16 and then executed. In one embodiment, the operating system loader program may be considered a component of the operating system (e.g., the boot sector may be considered a component of the operating system).

In one embodiment, the operating system is loaded from a storage drive (e.g., magnetic disk drive, optical disk drive, floppy disk drive, tape drive, etc.), and in another embodiment the operating system is loaded from a non-volatile semiconductor memory (e.g., EEPROM, FLASH, etc.).

The boot operation may comprise loading the operating system when the computer system 2 is powered on. Alternatively, the boot operation comprises loading the operating system during a reboot operation without powering on or power cycling the computer system. In one embodiment, the reboot operation is initiated through a software command, such as a designated operating system command. In another embodiment, the reboot operation is initiated through a hardware command, such as a user activating a button or a key board sequence (e.g., the key board sequence CTL-ALT-DEL).

Any suitable update routine comprising code segments that may be executed by the computer system may be employed in the embodiments of the present invention. In one embodiment, the update routine comprises an update driver (device driver) of a suitable operating system (Windows®, Mac OS®, UNIX, etc.). The update driver may be installed into the operating system in any suitable manner, such as by copying the update driver into an appropriate directory, and/or modifying an appropriate configuration file. In one embodiment, an installation application may be executed by the computer system to assist in installing the update driver. Once the update driver is installed, it may be loaded into the system memory 16 and executed as part of the boot operation. For example, the update driver may be loaded and executed by the operating system loader program, or the update driver may be loaded and executed by the operating system during an initialization phase of the operating system. In one embodiment, the update driver comprises at least one entry point procedure for interfacing with the update driver. For example, in one embodiment the update driver comprises a DriverEntry procedure which is called when the update driver is loaded and executed.

In another embodiment, the update routine comprises a suitable script file executed during the boot operation. For example, in one embodiment, the update routine comprises a startup script that is installed by copying it into an appropriate startup directory and/or modifying an appropriate configuration file of the operating system.

Figure 3:
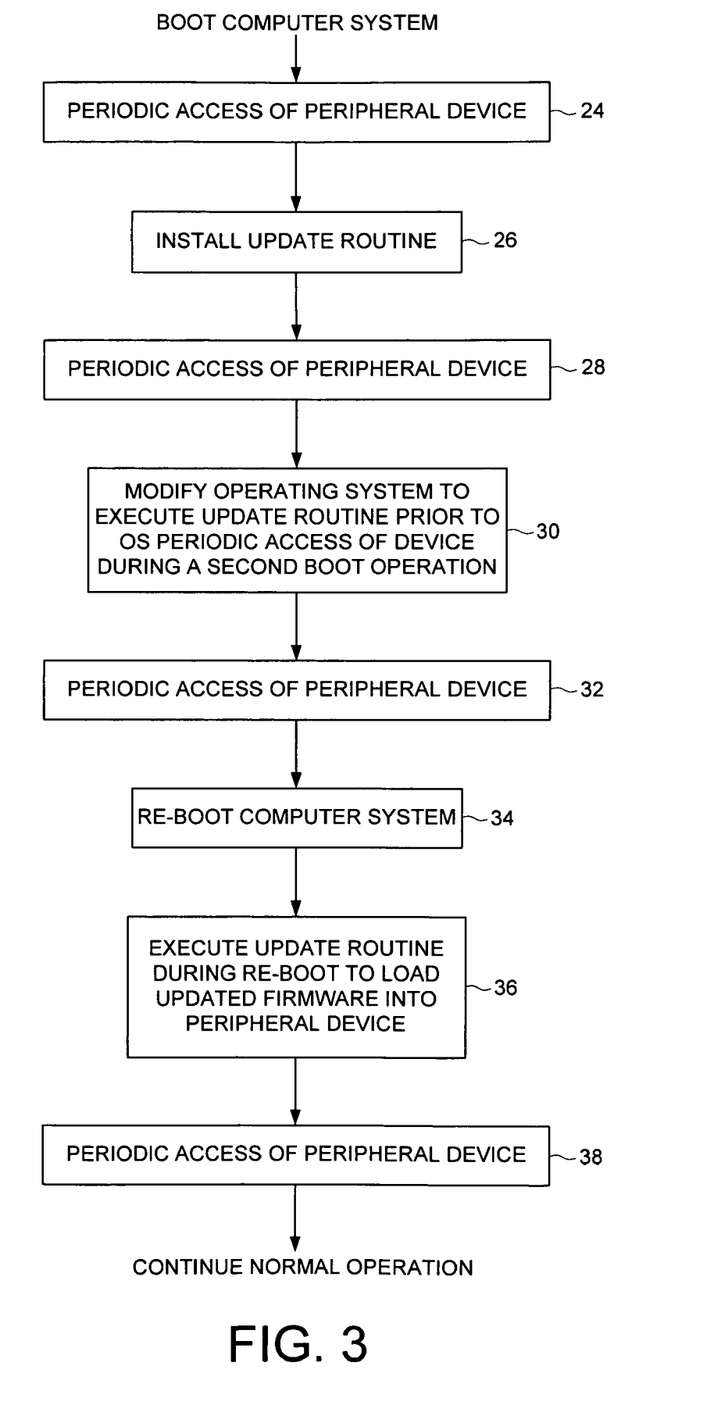
FIG. 3 is a flow diagram according to an embodiment of the present invention wherein the updated firmware is loaded into the peripheral device before the operating system begins to periodically access the peripheral device.

In one embodiment, when the firmware executed by the peripheral device 4 needs updating, the updated firmware is loaded early during the operating system's boot operation to avoid interfering with the normal operation of the computer system. In one embodiment, the operating system periodically accesses the peripheral device 4 (at a fixed or variable interval) such that, if the peripheral device 4 were busy loading the updated firmware received from the computer system 2, it may interfere with the operating system's periodic access and cause the operating system to fail. Therefore, in one embodiment the operating system is modified so that the update routine is executed during a boot operation prior to the operating system periodically accessing the peripheral device 4. This embodiment is illustrated in the flow diagram of FIG. 3, wherein after the computer system 4 is booted, at step 24 the operating system performs one of its periodic accesses of the peripheral device 4, and at step 26 the update routine is installed. At step 28 the operating system performs another periodic access of the peripheral device 4. At step 30 the operating system is modified so that the update routine is executed during a second boot operation prior to the operating system performing a periodic access of the peripheral device 4. At step 32 the operating system performs yet another periodic access of the peripheral device 4, and at step 34 the computer system is re-booted. At step 36 the update routine is executed during the second boot operation to load the updated firmware into the peripheral device prior to the operating system beginning its periodic access of the peripheral device 4. Once the updated firmware has been successfully loaded into the peripheral device 4, the boot operation continues, and the operating system begins to periodically access the peripheral device 4 at step 38.

Figure 4:
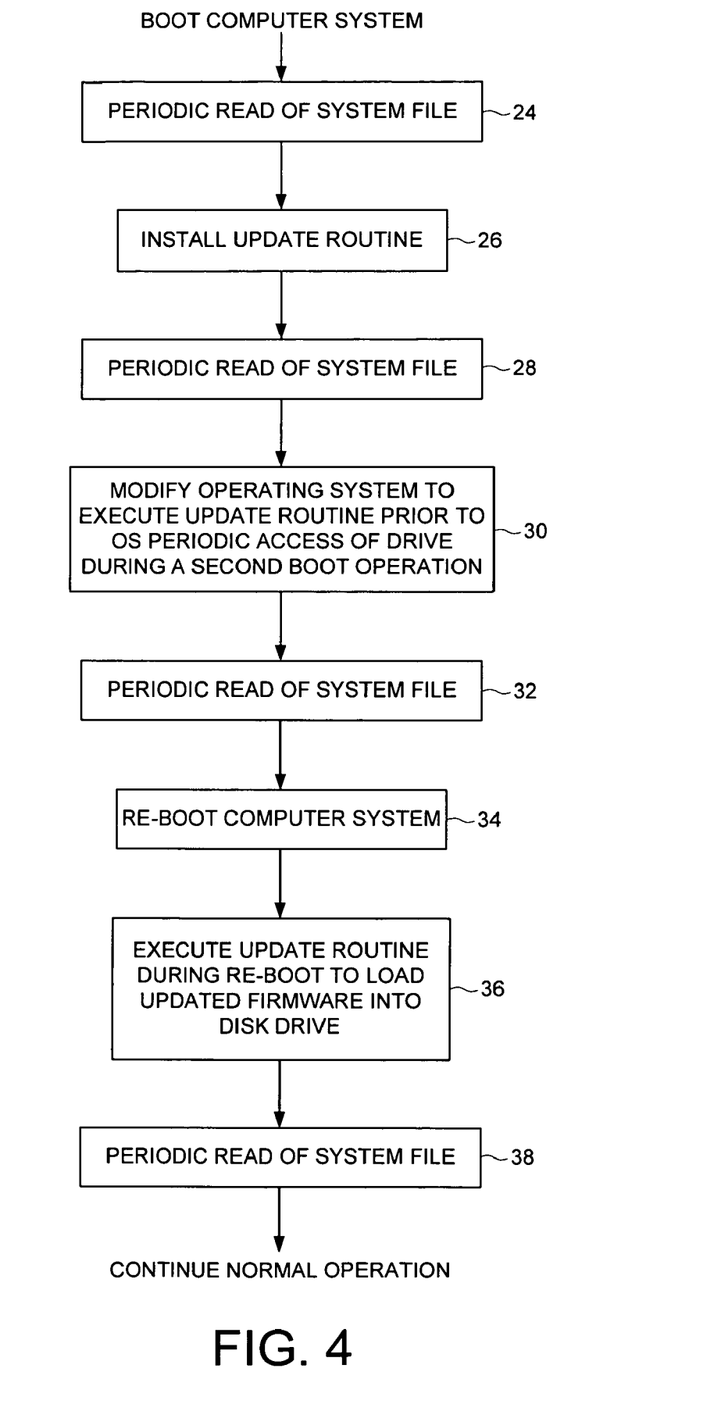
FIG. 4 is a flow diagram according to an embodiment of the present invention wherein the operating system periodically reads a system file from a disk drive.

In one embodiment, the operating system periodically accesses the disk drive 4 to periodically read a system file. For example, certain versions of the Windows® operating system periodically read a system file named "pagefile.sys". This embodiment is illustrated in the flow diagram of FIG. 4, wherein at step 36 the update routine is executed to load updated firmware into the disk drive 4 prior to the operating system periodically reading the system file stored on the disk drive 4 at step 38.

Figure 5:
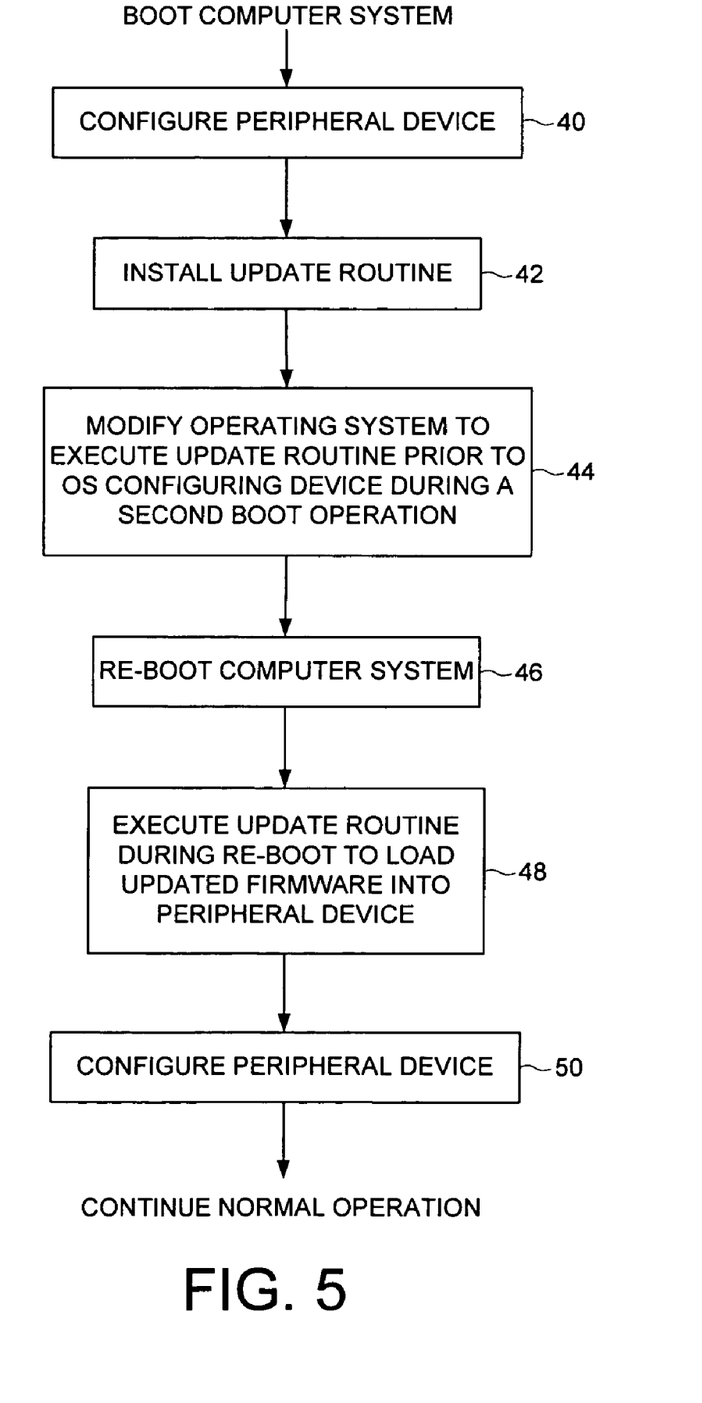
FIG. 5 is a flow diagram according to an embodiment of the present invention wherein the updated firmware is loaded into the peripheral device before the operating system configures the peripheral device.

In another embodiment, the operating system configures the peripheral device 4 during boot operations. For example, the operating system may configure the disk drive 4 into a desired operating mode, such as a particular direct memory access (DMA) mode. If updated firmware is subsequently loaded into the peripheral device 4, and the peripheral device 4 is reset in order to execute the updated firmware, the previous configuration may be lost. Therefore, in one embodiment, the operating system is modified so that the update routine is executed prior to the operating system configuring the peripheral device 4. This embodiment is illustrated in the flow diagram of FIG. 5, wherein at step 40 the operating system configures the peripheral device 4 during a first boot operation. At step 42 the update routine is installed, and at step 44 the operating system is modified so that the update routine is executed during a second boot operation prior to the operating system configuring the peripheral device 4. At step 46 the computer system is re-booted, and at step 48 the update routine is executed during the second boot operation to load the updated firmware into the peripheral device prior to the operating system configuring the peripheral device 4. After loading the updated firmware into the peripheral device 4, the operating system configures the peripheral device 4 at step 50. In one embodiment, the peripheral device 4 is reset to utilize the updated firmware before the operating system configures it at step 50.

Figure 6:
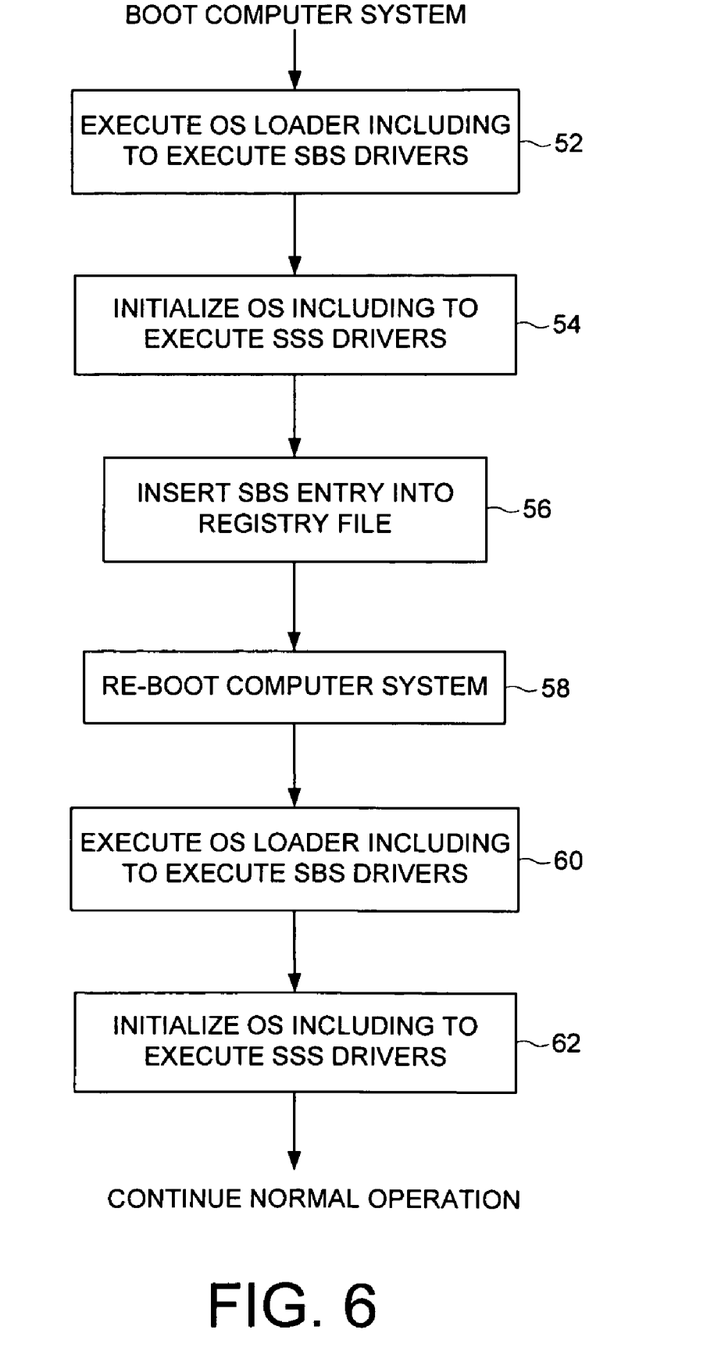
FIG. 6 is a flow diagram according to an embodiment of the present invention wherein a SERVICE_BOOT_START driver loads the updated firmware into the peripheral device.

The operating system may be modified in any suitable manner so that the update routine is executed early enough during the boot operation so as not to interfere with the normal operation of the computer system. In one embodiment, executing the first boot operation comprises executing an operating system loader program for loading the operating system into the computer system, the update routine comprises an update driver, and modifying the operating system comprises installing the update driver so that the operating system loader program executes the update driver upon a subsequent boot operation. In one embodiment, the operating system comprises a registry file and modifying the operating system comprises inserting a SERVICE_BOOT_START (SBS) entry into the registry file for the update driver so that the update driver is executed by the operating system loader program during the second boot operation. Other types of drivers, such as SERVICE_SYSTEM_START (SSS) drivers, are executed after the operating system has been loaded and during the initialization process of the operating system. This embodiment is illustrated in the flow diagram of FIG. 6, wherein at step 52 an operating system loader program is executed which loads the operating system and executes the SBS drivers listed in the registry file. At step 54 the operating system is initialized, including to execute the SSS drivers listed in the registry file. At step 56 an SBS entry is inserted into the registry file so that the update driver is executed during a second boot operation. At step 58 the computer system is rebooted, and at step 60 the operating system loader program loads the operating system and executes the SBS drivers listed in the registry file, including the update driver which loads the updated firmware into the peripheral device. At step 62 the operating system is initialized, including to execute the SSS drivers listed in the registry file.

Figure 7:
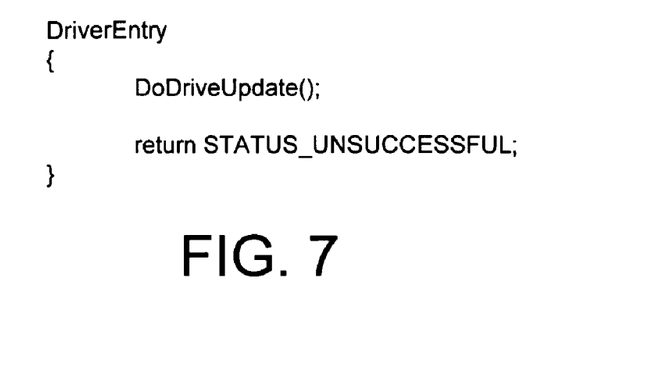
FIG. 7 shows example computer code for an update driver according to an embodiment of the present invention.

FIG. 7 shows pseudo-code according to an embodiment of the present invention, wherein the update routine comprises an update driver including a DriverEntry procedure that is called during the second boot operation in order to load the updated firmware into the peripheral device (e.g., by calling a DoDriveUpdate procedure). In one embodiment, the DriverEntry procedure returns an error code (e.g., STATUS_UNSUCCESSFUL) so that the update driver is unloaded during the second boot operation after the updated firmware has been loaded into the peripheral device. In one embodiment, the error code comprises a predefined constant value such as a predefined sequence of bits (e.g., 0x00000001). For example, with certain versions of the Windows® operating system, returning an error code of STATUS_UNSUCCESSFUL causes the computer system to be modified so that the update driver is not accessible by the operating system after the boot operation (e.g., after calling the DriverEntry procedure of the update driver). Since the update driver is unloaded (made not accessible) after the second boot operation, it may not be necessary to certify the update driver as compatible with the operating system.

The update driver may be unloaded in any suitable manner so that it is no longer accessible via the system memory 16. In one embodiment, unloading the update driver comprises modifying appropriate system parameters (e.g., appropriate configuration data structures stored in the system memory 16) so that the update driver is no longer accessible. In one embodiment, the part of the system memory 16 allocated for the update driver may be freed after unloading the update driver, and in another embodiment, the system memory 16 may remain allocated after unloading the update driver.

Figure 8:
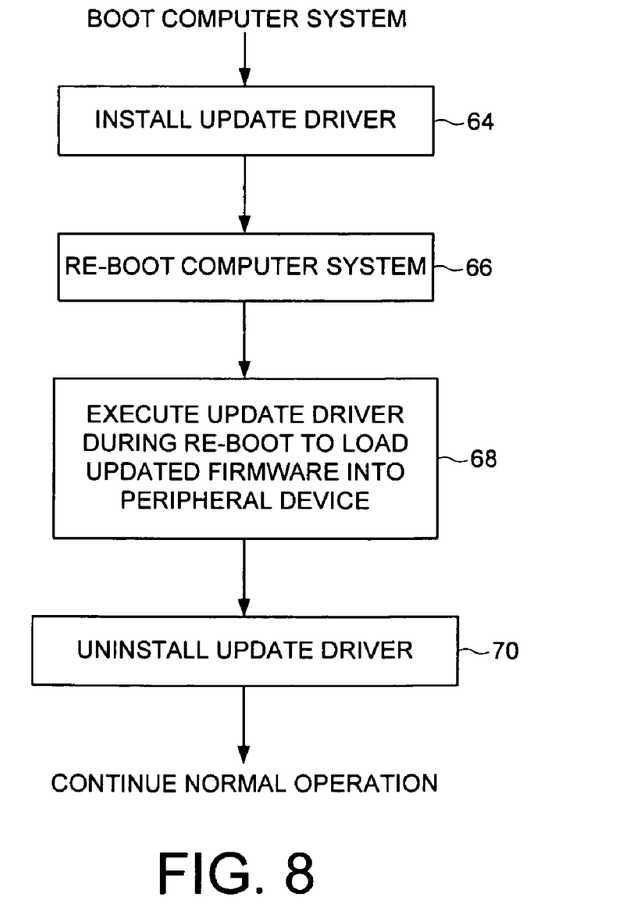
FIG. 8 is a flow diagram according to an embodiment of the present invention wherein the update driver that loads the updated firmware into the peripheral device is uninstalled.

In another embodiment of the present invention, the update driver is uninstalled after the second boot operation so that it is not executed during subsequent boot operations. This embodiment is shown in the flow diagram of FIG. 8, wherein at step 64 the update driver is installed, at step 66 the computer system is re-booted, at step 68 the update driver is executed to load the updated firmware into the peripheral device 4, and at step 70 the update driver is uninstalled.

Figure 9:
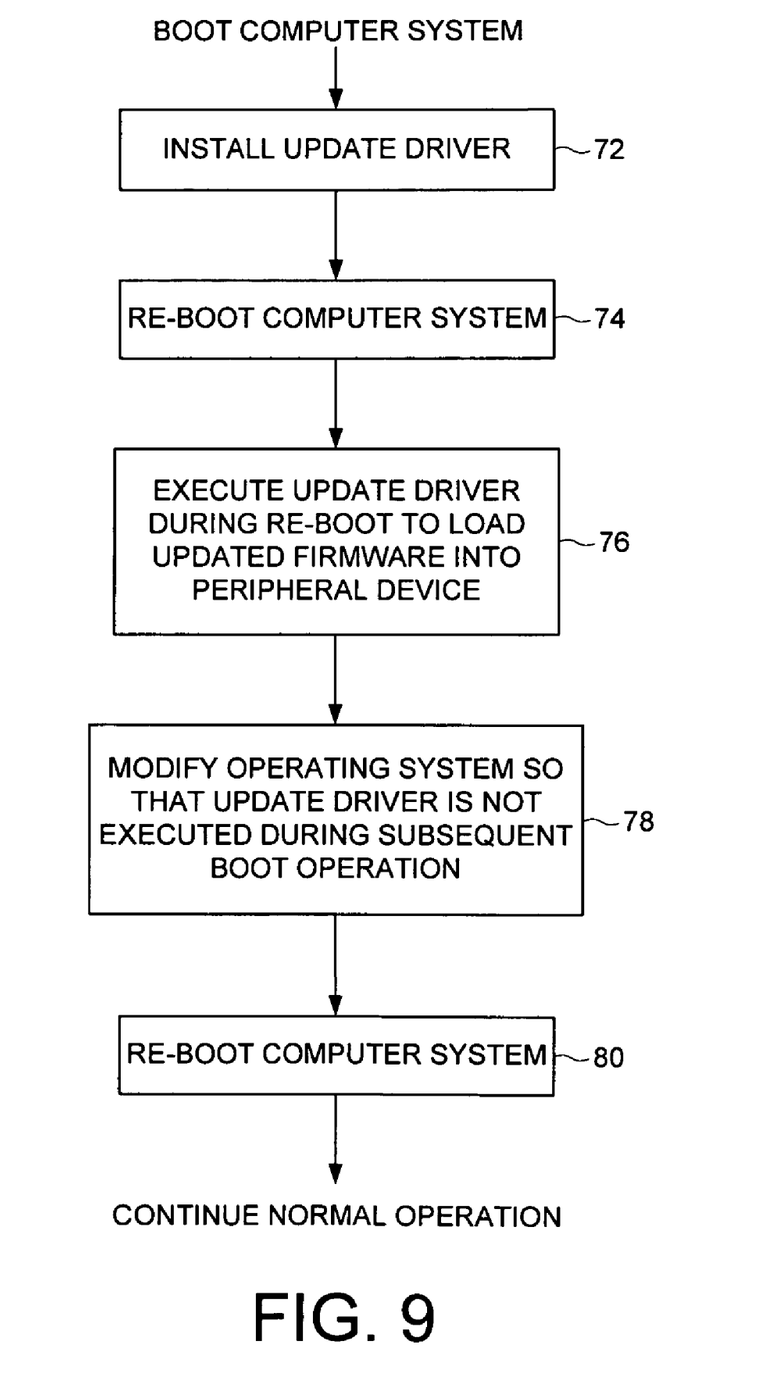
FIG. 9 is a flow diagram according to an embodiment of the present invention wherein the operating system is modified so that the update driver is uninstalled during a subsequent boot operation.

FIG. 9 shows an embodiment wherein at step 72 the update driver is installed, at step 74 the computer system is rebooted, at step 76 the update driver is executed, at step 78 the operating system is modified so that the update driver is not executed during a subsequent boot operation, and at step 80 the computer system is rebooted. In one embodiment, the operating system comprises a registry file, and installing the update driver at step 72 comprises inserting a corresponding entry in the registry file. In one embodiment, uninstalling the update driver at step 78 comprises deleting the corresponding entry in the registry file. In one embodiment, step 78 is performed during the current boot operation initiated at step 74, while in other embodiments, step 78 may be performed during a subsequent boot operation.

The update driver may be installed and uninstalled in any suitable manner. For example, the update driver may be installed by adding, modifying, moving, and/or renaming appropriate files, and the update driver may be uninstalled by deleting, modifying, moving and/or renaming appropriate files. In the embodiment described above, the update driver is installed by copying code segments to a disk drive, inserting a corresponding entry in a registry file, and uninstalled by deleting the entry from the registry file. For example, the registry file used in the Windows® operating system (e.g., Windows® 9x, Windows® CE, Windows NT®, and Windows® 2000) is a central hierarchical database used to store information necessary to configure the system for one or more users, applications, and hardware devices. Other operating systems, such as UNIX based operating systems, may employ a similar configuration file. In other embodiments, such as an embodiment employed in a Mac OS® 8.x or 9.x environment, the operating system may comprise a directory for storing installed drivers and a directory for storing uninstalled drivers, wherein uninstalling the update driver comprises moving the update driver from the installed directory to the uninstalled directory. In one embodiment, the update driver is deleted from the computer system when uninstalled, and in another embodiment, the operating system is modified to uninstall the update driver without deleting the update driver.

In one embodiment, an installation application is used to install the update driver and may also be used to uninstall the update driver. The installation application may be a program that is executed "on top" of the operating system, and may utilize operating system commands to carry out the installation (and optional uninstallation) process. In one embodiment, the installation application is executed by an end user, for example, by selecting a corresponding icon in a graphical user interface. In another embodiment, the installation application may be executed in connection with a specific event, such as when a disk comprising the installation application is inserted into a disk drive, or after downloading the installation application from a network such as the Internet.

Figure 10:
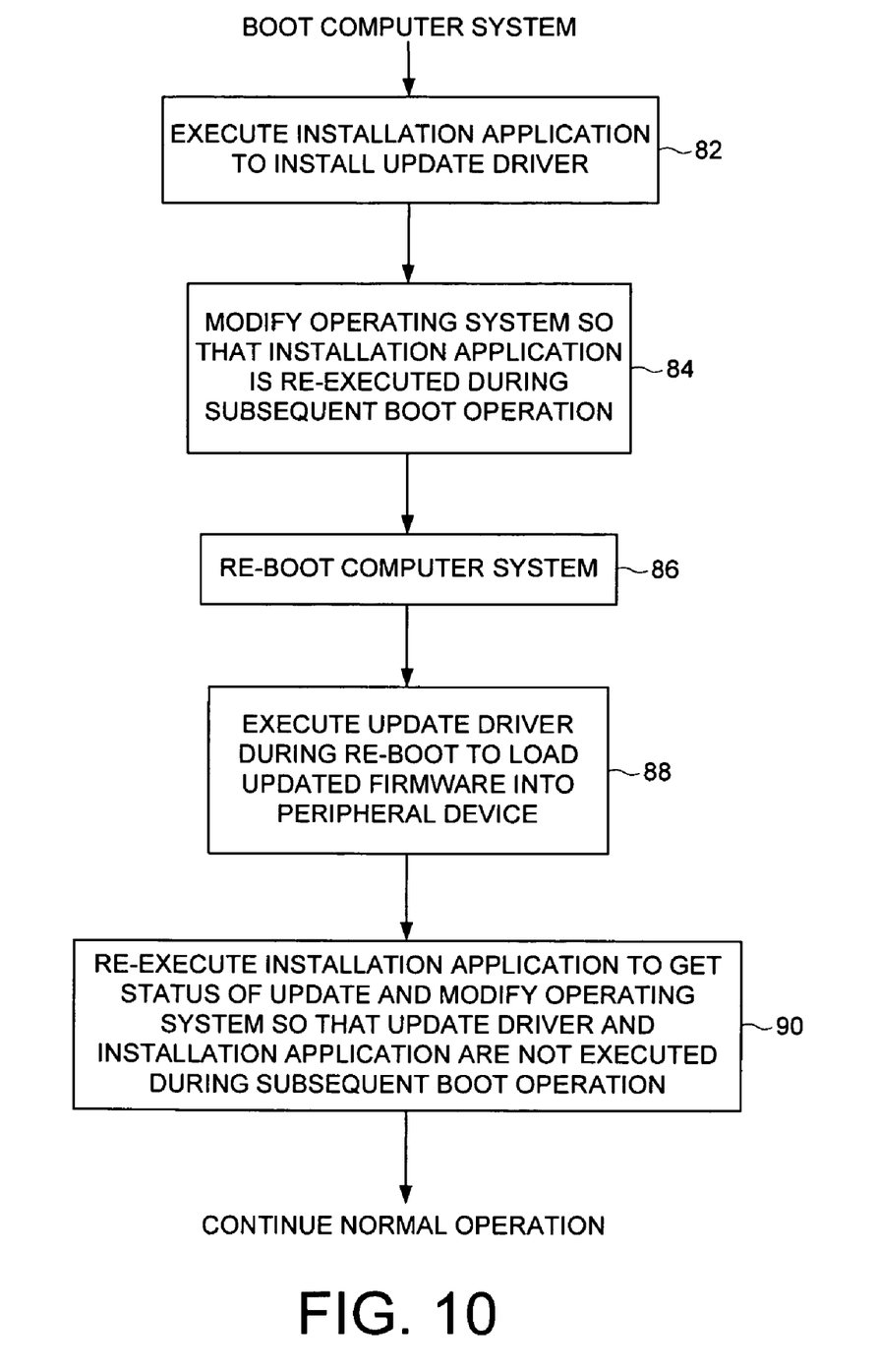
FIG. 10 is a flow diagram according to an embodiment of the present invention wherein an installation application installs the update driver after a first boot operation, and modifies the operating system so that the update driver is not executed during a subsequent boot operation.

FIG. 10 is a flow diagram according to an embodiment of the present invention wherein an installation application is executed to install the update driver at step 82. At step 84 the installation application modifies the operating system so that the installation application is re-executed during a subsequent boot operation. The operating system may be modified in any suitable manner, such as by modifying an appropriate system file (e.g., inserting a RunOnce entry into a registry file), or copying the installation application into an appropriate directory (e.g., a startup directory), so that the installation application is re-executed during the subsequent boot operation. At step 86 the computer system is rebooted, and at step 88 the update driver is executed to load the updated firmware into the peripheral device. At step 90 the installation application is re-executed (during the current or a subsequent boot operation) to get the status of the firmware update and to modify the operating system so that the update driver and the installation application are not executed during subsequent boot operations.

In one embodiment, the installation application makes suitable modifications to the operating system so that the installation application is not executed during subsequent boot operations, such as by moving the installation application out of a startup directory, or by modifying a registry file by deleting a corresponding RunOnce entry. In another embodiment, the installation application uninstalls the update driver by modifying the operating system so that the update driver is not executed during subsequent boot operations, such as by moving the update driver out of an installed directory, or by modifying a registry file by deleting a corresponding SERVICE_BOOT_START entry.

Figure 11:
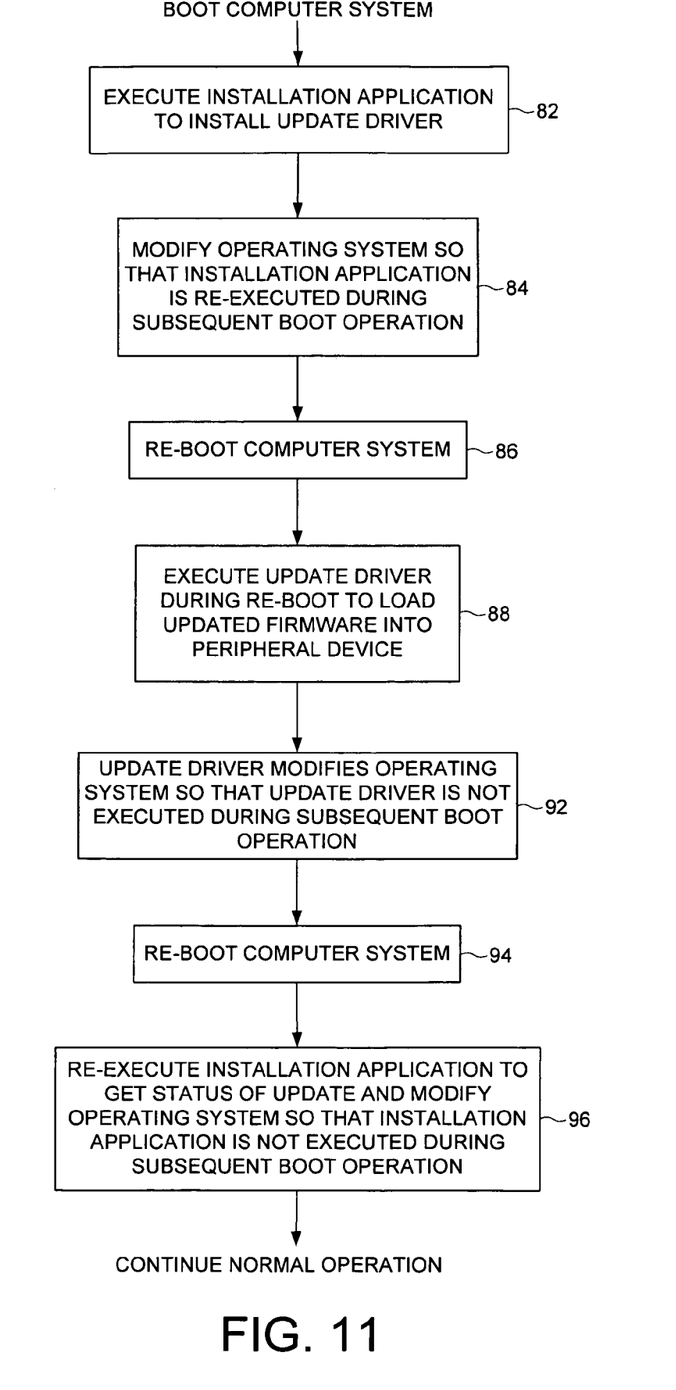
FIG. 11 is a flow diagram according to an embodiment of the present invention wherein the update driver modifies the operating system so that the update driver is not executed during a subsequent boot operation.

In an alternative embodiment shown in the flow diagram of FIG. 11, at step 92 the update driver uninstalls itself by modifying the operating system (e.g., by moving the update driver out of an installed directory, or by deleting a corresponding SERVICE_BOOT_START entry from the registry file) so that the update driver is not executed during subsequent boot operations. At step 94 the computer system is rebooted, and at step 96 the installation application is re-executed to get the status of the update and to modify the operating system so that the installation application is not executed during subsequent boot operations.

Figure 12:
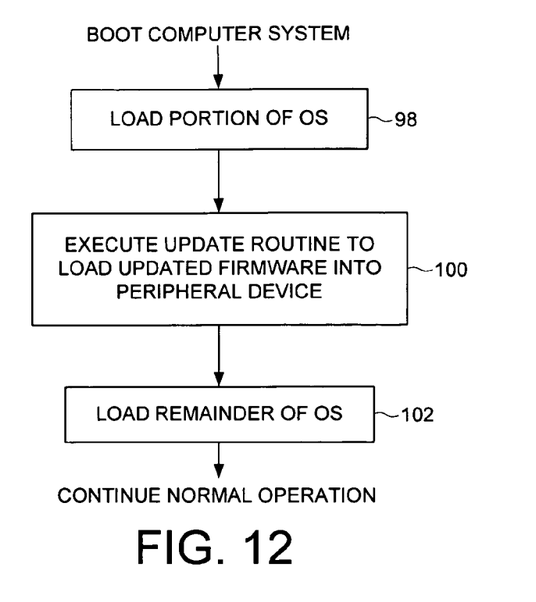
FIG. 12 is a flow diagram according to an embodiment of the present invention wherein a portion of the operating system is loaded, the updated firmware is loaded into the peripheral device, and then the remainder of the operating system is loaded.

FIG. 12 is a flow diagram according to another embodiment of the present invention, wherein at step 98 a first portion of the operating system is loaded into the computer system during a boot operation, at step 100 updated firmware is loaded into a peripheral device before completing the boot operation, and at step 102 the remainder of the operating system is loaded into the computer system. In one embodiment, the computer system is not rebooted after loading the updated firmware into the peripheral device, instead it continues with the same boot operation.

Figure 13:
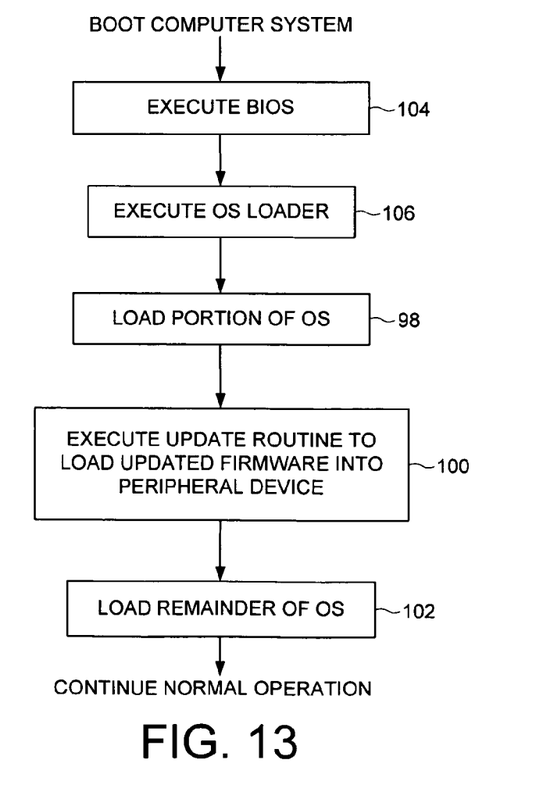
FIG. 13 is a flow diagram according to an embodiment of the present invention wherein a basic input/output system (BIOS) executes an operating system loader program to load the operating system into the computer system.

In one embodiment shown in the flow diagram of FIG. 13, at step 104 a basic input/output system (BIOS) is executed by the computer system 2 as described above. In one embodiment, the BIOS executes an operating system loader program at step 106 to load the operating system into the computer system. The operating system loader program loads the first portion of the operating system at step 98, and then executes the update routine to load the updated firmware into the peripheral device at step 100. In one embodiment, the first portion of the operating system comprises the operating system loader program. In another embodiment, the first portion of the operating system comprises one or more drivers, such as a SERVICE_BOOT_START driver for accessing a disk drive. As described above, in one embodiment the operating system loader program executes an update driver designated as a SERVICE_BOOT_START driver in a registry file to load the updated firmware into the peripheral device. In another embodiment, the first portion comprises initial components of the operating system (e.g., drivers, kernel, etc.) required to execute the update routine implemented as a startup script file. The remainder of the operating system is then loaded at step 102.

The flow diagrams described above with reference to the figures may be implemented as code segments stored on a computer readable storage medium, such as a non-volatile semiconductor memory, an optical disk, or a magnetic disk. Thus, one embodiment of the present invention comprises a computer readable storage medium storing code segments of an installation application for installing an update routine, and another embodiment of the present invention comprises a computer readable storage medium storing code segments of an update driver for updating firmware of a peripheral device coupled to a computer system.

In one embodiment, the update routine comprises the updated firmware loaded into the peripheral device. For example, the update routine may be compiled together with the updated firmware to generate a combined executable file, wherein the updated firmware is represented as a defined data structure accessed by the update routine for loading into the peripheral device. In an alternative embodiment, the updated firmware is accessed by the update routine separately, such as by accessing a data file (e.g., registry file).

Any suitable technique may be employed to determine when a peripheral device needs a firmware update. In one embodiment, the installation application scans the peripheral devices, for example, by evaluating a firmware version number, serial number, or device ID of each peripheral device, and then inserts an entry into the registry file identifying each peripheral device that needs a firmware update. When the update routine is executed during the second boot operation, it loads updated firmware into each peripheral device identified by the information in the registry file.

I claim:

1. A method of updating firmware of a peripheral device coupled to a computer system, the method comprising:
    executing a first boot operation for loading an operating system into the computer system;

installing an update routine for loading updated firmware into the peripheral device;

modifying the operating system so that the operating system executes the update routine during a second boot operation; and executing the second boot operation, during which the update routine is executed to load the updated firmware into the peripheral device;

wherein:

the operating system configures the peripheral device during each boot operation; and the step of modifying the operating system further comprises modifying the operating system so that the update routine is executed prior to the operating system configuring the peripheral device.

2. The method as recited in claim 1, wherein the operating system periodically accesses the peripheral device, and wherein modifying the operating system comprises modifying the operating system so that the update routine is executed prior to the operating system periodically accessing the peripheral device.

3. The method as recited in claim 2, wherein:

the peripheral device comprises a disk drive; and the operating system periodically accesses the disk drive to read a system file.

4. The method as recited in claim 3, wherein:

the operating system comprises a Windows operating system; and the system file comprises a "pagefile.sys" file of the Windows operating system.

5. The method as recited in claim 1, wherein:

executing the first boot operation further comprises executing an operating system loader program for loading the operating system into the computer system;

the update routine comprises an update driver; and modifying the operating system further comprises installing the update driver so that the operating system loader program executes the update driver during the second boot operation.

6. The method as recited in claim 5, wherein:

the operating system comprises a registry file; and modifying the operating system comprises inserting a SERVICE_BOOT_START entry into the registry file for the update driver.

7. The method as recited in claim 1, wherein:

the update routine comprises an update driver including a DriverEntry procedure; and executing the second boot operation includes executing the DriverEntry procedure to load the updated firmware into the peripheral device.

8. A method of updating firmware of a peripheral device coupled to a computer system, the method comprising:

executing a first boot operation for loading an operating system into the computer system;

installing an update driver for loading updated firmware into the peripheral device;

modifying the operating system to execute the update driver during a second boot operation of the computer system;

executing the second boot operation, during which the update driver is executed to load the updated firmware into the peripheral device; and uninstalling the update driver;

wherein:

the operating system configures the peripheral device during each boot operation; and the step of modifying the operating system further comprises modifying the operating system so that the update routine is executed prior to the operating system configuring the peripheral device.

9. The method as recited in claim 8, wherein uninstalling the update driver occurs during the second boot operation.

10. The method as recited in claim 8, wherein uninstalling the update driver comprises modifying the operating system so that the update driver is not executed during a boot operation subsequent to the second boot operation.

11. The method as recited in claim 8, wherein:

the operating system comprises a registry file; and installing the update driver comprises inserting a corresponding entry in the registry file.

12. The method as recited in claim 11, wherein uninstalling the update driver comprises deleting the corresponding entry in the registry file.

13. The method as recited in claim 8, wherein the update driver returns an error code to unload the update driver during the second boot operation.

14. The method as recited in claim 13, wherein the error code comprises ERROR_UNSUCCESSFUL.

15. The method as recited in claim 8, wherein:

installing the update routine comprises executing an installation application to install the update driver after the first boot operation; and the method further comprises modifying the operating system so that the installation application is re-executed during a subsequent boot operation.

16. The method as recited in claim 15, wherein the subsequent boot operation is the second boot operation.

17. The method as recited in claim 15, wherein:

the operating system comprises a registry file; and modifying the operating system further comprises inserting a RunOnce entry into the registry file so that the installation application is re-executed during the subsequent boot operation.

18. The method as recited in claim 8, wherein:

installing the update routine comprises executing an installation application to install the update driver after the first boot operation; and uninstalling the update routine comprises the installation application modifying the operating system so that the update driver is not executed during a subsequent boot operation.

19. A computer readable storage medium storing code segments of an installation application, the code segments configured to be executed by a computer system comprising an operating system, the code segments for:

installing an update routine for loading updated firmware into a peripheral device coupled to the computer system; and modifying the operating system so that the operating system executes the update routine during a boot operation;

wherein:

the operating system configures the peripheral device during each boot operation; and the step of modifying the operating system further comprises modifying the operating system so that the update routine is executed prior to the operating system configuring the peripheral device.

20. The computer readable storage medium as recited in claim 19, wherein the operating system periodically accesses the peripheral device, and wherein modifying the operating system comprises modifying the operating system so that the update routine is executed prior to the operating system periodically accessing the peripheral device.

21. The computer readable storage medium as recited in claim 20, wherein:

the peripheral device comprises a disk drive; and the operating system periodically accesses the disk drive to access a system file.

22. The computer readable storage medium as recited in claim 21, wherein:

the operating system comprises a Windows operating system; and the system file comprises a "pagefile.sys" file of the Windows operating system.

23. The computer readable storage medium as recited in claim 19, wherein:

the computer system further comprises an operating system loader program for loading the operating system into the computer system;

the update routine comprises an update driver; and modifying the operating system comprises installing the update driver so that the operating system loader program executes the update driver.

24. The computer readable storage medium as recited in claim 23, wherein:

the operating system comprises a registry file; and modifying the operating system comprises inserting a SERVICE_BOOT_START entry into the registry file for the update driver.

* * * * *